United States Patent
Nakagiri et al.

(10) Patent No.: US 6,576,370 B1
(45) Date of Patent: Jun. 10, 2003

(54) POSITIVE ELECTRODE AND LITHIUM BATTERY USING THE SAME

(75) Inventors: Yasushi Nakagiri, Kyotanabe (JP); Yasuhiko Bito, Osaka (JP); Hiromu Matsuda, Hyogo (JP); Tadashi Sotomura, Kashiwara (JP); Yoshinori Toyoguchi, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/557,420

(22) Filed: Apr. 21, 2000

(30) Foreign Application Priority Data

Apr. 26, 1999 (JP) ............................................. 11-117804
May 26, 1999 (JP) ............................................. 11-146069

(51) Int. Cl.$^7$ .......................... H01M 4/58; H01M 4/60; H01M 4/88
(52) U.S. Cl. ................ 429/231.95; 429/213; 252/182.1
(58) Field of Search .......................... 429/231.95, 231.9, 429/218.1, 212, 213; 252/182.1; 525/540

(56) References Cited

U.S. PATENT DOCUMENTS

| | | | |
|---|---|---|---|
| 4,833,048 A | | 5/1989 | Dejonghe et al. |
| 5,324,599 A | * | 6/1994 | Oyama et al. ............... 429/192 |
| 5,523,179 A | | 6/1996 | Chu |
| 5,814,420 A | | 9/1998 | Chu |
| 6,017,651 A | | 1/2000 | Nimon et al. |
| 6,190,426 B1 | * | 2/2001 | Thibault et al. ........... 29/623.2 |

FOREIGN PATENT DOCUMENTS

| | | |
|---|---|---|
| EP | 0 797 264 A2 | 9/1997 |
| EP | 0 818 839 A2 | 1/1998 |
| JP | 05 135767 | 6/1993 |
| JP | 05 135800 | 6/1993 |
| JP | 05 135801 | 6/1993 |
| JP | 05 314964 | 11/1993 |
| JP | 2000-67852 * | 3/2000 ............ H01M/4/02 |

* cited by examiner

Primary Examiner—Stephen Kalafut
Assistant Examiner—Raymond Alejandro
(74) Attorney, Agent, or Firm—Akin, Gump, Strauss, Hauer & Feld, L.L.P.

(57) ABSTRACT

The present invention provides a positive electrode, which contains at least one organic sulfide compound selected from the group consisting of a thiolato compound and a thiol compound, and at least one selected from the group consisting of sulfur and a lithium sulfide represented by Formula (1): $(Li_xS)_n$, where $0<x\leq2$ and $n>0$, a method of manufacturing the positive electrode, and a lithium battery using the positive electrode. Compared with the prior art lithium battery, the lithium battery using the positive electrode of the present invention has a greater capacity and a higher voltage. The positive electrode of the present invention effectively suppresses escape of the positive electrode active material from the positive electrode during charge and discharge operations and thus actualizes a secondary battery of high energy density having a less decrease in service capacity.

6 Claims, 4 Drawing Sheets

POSITIVE ELECTRODE AND LITHIUM BATTERY USING THE SAME

BACKGROUND OF THE INVENTION

The present invention relates to a lithium battery and in particular to a lithium secondary battery with lithium and sulfur contained in a positive electrode thereof and a method of producing the lithium secondary battery.

Since the finding of conductive polyacetylene in 1971, conductive polymer electrodes have been studied vigorously as application of the conductive polymer for the electrode material may actualize development of improved electrochemical elements, such as batteries of light in weight and high energy density, large-area electrochromic elements, and biochemical sensors using minute electrodes. Relatively stable polymers like polyaniline, polypyrrole, polyacene, and polythiophene have also been developed as other π-electron conjugated conductive polymers. Lithium secondary batteries using these polymers as the positive electrode have also been developed. It is said these batteries have the energy density of 40 to 80 Wh/kg.

Organic disulfide has been proposed in U.S. Pat. No. 4,833,048 as the organic material that is expected to attain the higher energy density. The simplest form of the organic disulfide compound is represented as $M^+$—$^-$S—R—S$^-$—$M^+$, where R is an aliphatic or aromatic organic group, S is sulfur, and $M^+$ is a proton or a metal cation. This compound is combined via the S—S bonding by electrolytic oxidation to form a polymer like:

The polymer thus obtained is returned to the original monomer by electrolytic reduction. A metal—sulfur secondary battery, in which a metal M that supplies and traps the cation M+is combined with the organic disulfide compound, has also been proposed in the above US patent.

These batteries use the negative electrode of metal lithium and have the working voltage of 3 to 4 V and the energy density of not less than 150 Wh/kg. This level of energy density is comparable to or better than the energy density of conventional secondary batteries.

With a view to further increasing the energy density, the simple substance of sulfur may be used for the positive electrode by taking advantage of the high capacitance of sulfur as proposed in U.S. Pat. No. 5,523,179. This battery uses metal lithium for the negative electrode and is expected to have the working voltage of about 2V and the high energy density of 100 to 800 Wh/kg.

The organic disulfide compound, however, has a disadvantage of gradually decreasing the capacitance by repeated oxidation-reduction (charging-discharging), that is, polymerization through electrolytic oxidation (charging) and monomerization through electrolytic reduction (discharging). This is ascribed to the reason discussed below.

Oxidation (charging) of the organic disulfide compound gives a polydisulfide compound having electrical insulation properties and poor ion conductivity. The polydisulfide compound has a low solubility in an electrolyte. The organic disulfide monomer obtained by monomerization of the polydisulfide compound through reduction (discharging) has a high solubility in the electrolyte. The disulfide monomerized by reduction (discharging) is partly dissolved in the electrolyte, and the dissolved monomer is polymerized by oxidation (charging) at positions different from the original positions in the electrode. The polydisulfide compound polymerized and depositing apart from the conductive agent, such as carbon, is isolated from the electron-ion conductive network in the electrode and is not concerned in the electrode reactions. The repeated oxidation-reduction increases the isolated polysulfide compound and thereby gradually lowers the capacitance of the battery. The organic disulfide monomer having the high solubility easily moves to be escaped from the positive electrode into the separator, the electrolyte, and the negative electrode.

The battery having the positive electrode containing the organic disulfide compound accordingly has disadvantages of the lowered charge-discharge efficiency and the shortened charge-discharge cycle life. In the case where metal lithium is used for the negative electrode in order to improve the volumetric energy density, dendrite may be produced on the surface of the metal lithium in the course of the charge-discharge cycle. This may lead to a short circuit to make a fire or may lower the charge-discharge efficiency.

In the case where the simple substance of sulfur is used for the positive electrode in order to improve the capacitance, the battery has a relatively low working voltage of about 2V and poor charge-discharge cycle characteristics. The deterioration of the charge-discharge cycle in the case of using the simple substance of sulfur for the positive electrode may be ascribed to the phenomenon discussed below.

The simple substance of sulfur has lots of known allotropic forms. Cyclooctasulfur ($S_8$) includes α-sulfur (orthorhombic sulfur), β-sulfur (monoclinic sulfur), and γ-sulfur (monoclinic sulfur). Cyclohexasulfur ($S_6$) generally has a rhombohedral crystal system, but also includes macrocyclic, chain, and amorphous structures. There is little energy difference among these structures. It is accordingly thought that sulfur forms chains and takes a variety of shapes unstably. Using the sulfur powder as a starting material of charge and discharge and repeating the charge (insertion of lithium) and discharge (removal of lithium) causes the sulfur of the initial state to be not reproduced and leads to isolation of the dielectric sulfur. This prevents the transmission of electrons and insertion of lithium ions.

One object of the present invention is thus to provide a positive electrode, where the redox reaction proceeds at a high speed even at room temperature and the voltage characteristics of the organic sulfide compound and the high capacitance and the high energy density of sulfur and lithium sulfide are not damaged.

Another object of the present invention is to provide a lithium secondary battery of high energy density, which suppresses escape and isolation of the positive electrode active material from the positive electrode during the charging and discharging operations, keeps the voltage characteristics of the organic sulfide compound and the high capacitance of sulfur and lithium sulfide, and has a relatively fixed discharge voltage of 3 V level.

Still another object of the present invention is to provide a method of manufacturing the positive electrode to provide such a lithium secondary battery.

BRIEF SUMMARY OF THE INVENTION

The present invention is directed to a positive electrode, which contains at least one organic sulfide compound selected from the group consisting of a thiolato compound and a thiol compound, and at least one selected from the group consisting of sulfur and a lithium sulfide represented by Formula (1) given below:

where $0 < x \leq 2$ and $n > 0$.

It is especially preferable that the positive electrode contains at least one organic sulfide compound selected from the group consisting of a thiolato compound and a thiol compound, and a lithium sulfide represented by Formula (1) given below:

$$(Li_xS)_n \quad (1)$$

where $0<x\leq 2$ and $n>0$.

It is preferable that the organic sulfide compound is a metal complex.

In accordance with one preferable application of the present invention, the positive electrode further contains a conductive polymer.

It is preferable that the thiolato compound is at least one selected from the group consisting of a lithium disulfide compound, a lithium trisulfide compound, and a lithium tetrasulfide compound.

It is also preferable that the thiol compound is at least one selected from the group consisting of a disulfide compound, a trisulfide compound, and a tetrasulfide compound.

The present invention is also directed to a method of producing a positive electrode. The method includes the steps of: (a) dissolving at least one organic sulfide-compound selected from the group consisting of a thiolato compound and a thiol compound, in a solvent to provide a solution; (b) mixing at least one selected from the group consisting of sulfur and a lithium sulfide represented by Formula (1) given below with the solution thus obtained to provide a mixture:

$$(Li_xS)_n \quad (1)$$

where $0<x\leq 2$ and $n>0$; and (c) applying the mixture thus obtained on a conductive substrate and heating the conductive substrate in an atmosphere of inert gas or in vacuo to obtain the positive electrode.

It is preferable that the solvent is at least one selected from the group consisting of tetrahydrofuran, N,N-dimethylformamide, and N—R-2-pyrrolidone, wherein R represents either a hydrogen atom or an alkyl group.

In accordance with one preferable application of the present invention, the method further includes the step of adding a conductive polymer to the solution obtained in the step (a), prior to the step (b).

In accordance with another preferable application of the present invention, the method further includes the step of lithiating the thiol compound and/or sulfur included in the positive electrode, after the step (c).

The present invention is further directed to a lithium battery including the positive electrode discussed above, a negative electrode, and a non-aqueous electrolyte.

Further, the lithium battery may be a primary battery or a secondary battery, and the non-aqueous electrolyte includes a lithium salt.

DETAILED DESCRIPTION OF THE INVENTION

The present invention is directed to a positive electrode, which contains at least one organic sulfide compound selected from the group consisting of a thiolato compound and a thiol compound, and at least one selected from the group consisting of sulfur and a lithium sulfide represented by Formula (1) given below:

$$(Li_xS)_n \quad (1)$$

where $0<x<2$ and $n>0$.

The positive electrode of the present invention for a lithium battery has an Inorganic-organic hybrid structure comprising, as active materials, at least one selected from the group consisting of a thiolato compound and a thiol compound and at least one selected from the group consisting of sulfur and a lithium sulfide. It is preferable that both the active materials are homogeneously dispersed in the molecular level in the inorganic-organic hybrid structure.

The thiol compound (monomer) or the thiolato compound (monomer) is fixed together with sulfur and/or lithium sulfide in the molecular level in the positive electrode having the inorganic-organic hybrid structure. This configuration effectively decreases or inhibits escape of the thiol compound (monomer) or the thiolato compound (monomer) from the positive electrode and isolation of sulfur.

Therefore, this configuration also enables the positive electrode to operate or drive with a voltage of the thiol compound or the thiolato compound, while keeping the high volumetric capacities of sulfur or lithium sulfide. In other words, the battery with the positive electrode using the active materials homogeneously dispersed in the molecular level holds a high capacitance while keeping a voltage of about 3V. The capacitance of the battery is not lowered under the conditions of repeated charge and discharge. This arrangement of the invention actualizes a lithium battery having favorable charge-discharge cycles.

The battery having the positive electrode comprising a thiolato compound and lithium sulfide of the present invention does not require that the negative electrode contains lithium. The battery accordingly has a negative electrode free from metal lithium. This avoids the possible problems due to the use of metal lithium, for example, potential danger and deteriorating capacity.

The following describes the constituents of the positive electrode of the present invention, the method of manufacturing the positive electrode, and the lithium battery including the positive electrode.

1. Constituents of Positive Electrode (1) Thiol Compound

Available examples of the thiol compound used as one organic sulfide compound of the present invention include organic disulfide compounds, organic trisulfide compounds, and organic tetrasulfide compounds. These compounds have different numbers of sulfur atoms included in the monomer molecule. The state of linkage of these compounds is changed between the sulfur-sulfur bonding and the sulfur-lithium bonding by the charging and discharging processes.

In the thiol compound, the sulfur-sulfur bonding is broken in the course of discharging to produce the sulfur-metal ion (including lithium and proton) bonding, whereas the sulfur-sulfur bonding is reproduced in the course of charging.

The organic disulfide compound is represented by a general formula of:

$$(R(S)_y)_n \qquad (2)$$

where R represents an aliphatic group or an aromatic group, S represents a sulfur atom, y is an integer of not less than 1, and n is an integer of not less than 2. Typical examples of the organic disulfide compound represented by the general formula (2) include dithioglycol ($HSCH_2CH_2SH$), 2,5-dimercapto-1,3,4-thiadiazole ($C_2N_2S(SH)_2$), s-triazine-2,4,6-trithiol ($C_3H_3N_4S_2$), 7-methyl-2,6,8-trimercaptopurine ($C_6H_6N_4S_3$), and 4,5-diamino-2,6-dimercaptopyrimidine ($C_4H_6N_4S_2$). These compounds are commercially available and used as delivered.

A compound containing dimers and trimers of the organic disulfide compound polymerized with an oxidant, such as iodine, potassium hexacyanoferrate(III), or hydrogen peroxide may also be used as the thiol compound. The organic disulfide compound may be polymerized chemically with the oxidant or by an electrolytic oxidation method without any oxidant.

(2) Thiolato Compound

The thiolato compound is obtained, for example, by lithiating the thiol compound discussed above. A concrete procedure prepares a thiolato compound by lithiating the thiol compound as a starting material with R—Li, where R is an aliphatic group or an aromatic group, such as butyl lithium or phenyl lithium.

The lithium thiolato compound generates a sulfur-sulfur bonding by charging and regenerates a sulfur-lithium ion bonding by discharging.

The sulfur-lithium bonding may be formed by a first discharge cycle or an additional chemical treatment after the positive electrode has been prepared from a thiol compound and lithium sulfide. In this case, the above characteristics are attained by an inorganic-organic hybrid structure, where the thiol compound and lithium sulfide are homogeneously mixed in a molecular level.

(3) Metal Complexes of Thiol Compound and Thiolato Compound

A metal complex of an organic sulfide compound (hereinafter referred to as "SS"), such as a thiol compound or a thiolato compound, functions itself as an active material and prevents the SS, the thiolato compound, and their composite substance with polyaniline from being dissolved in an electrolyte and escaped or dispersed from the positive electrode. This ensures the excellent charge-discharge cycle life and attains a substantially fixed and stable voltage.

The metal for constituting the metal complex preferably has varying ionic valence; for example, Cu, Ag, Au, Ni, Pd, Pt, Co, Rh, Ir, Cr, Mn, and Fe. The varying ionic valence causes the monomerization and polymerization as well as the variation in ionic valence to be included in the redox reaction, thereby contributing to an increase in service capacity. Cu and Ag are preferable examples, and especially preferable is Cu.

The metal complex is obtained from a salt of the metal and the SS. Available examples of the metal salt for preparing the metal complex are given below.

Examples of the copper salt include divalent copper salts, such as copper (II) chloride and copper N,N-diethylcarbamate $((C_2H_5)_2NCSS)_2CU$, and univalent copper salts, such as one obtained by reducing copper (II) chloride with $SO_2$. Examples of the silver salt include univalent silver salts, such as silver nitrate, silver N,N-diethylcarbamate $(C_2H_5)_2NCSSAg$, silver trifluoromethanesulfonate $CF_3SO_3Ag$, and silver tetrafluoroborate $AgBF_4$. Equivalent salts of other metals may also be used.

The complexation of the SS with the metal salt may be implemented by mixing an ethanol solution of the SS with an ethanol solution of the metal salt as discussed later in examples. Other techniques may, however, be used for the complexation. Further in the present invention, a plurality of metal complexes may be mixed or a metal complex may include two or more metals.

Examples of the SS-copper and SS-silver complexes are $CuAg(C_2HN_2S_3)_4$ in the case of using 2,5-dimercapto-1,3,4-thiadiazole, $CuAg(C_2H_2S_2)_4$ in the case of using dithioglycol, $Cu_3Ag_3(C_3N_3S_3)_4$ in the case of using s-triazine-2,4,6-trithiol, $CuAg(C_6H_4N_4S_3)_4$ in the case of using 7-methyl-2,6,8-trimercaptopurine, and $CuAg(C_4H_4N_4S_2)_4$ in the case of using 4,5-diamino-2,6-dimercaptopyrimidine.

The metal complex of the thiol compound may be lithiated to provide a metal complex having a thiolato group. The lithiation may be attained by a chemical treatment in a solution of R—Li (where R is an aliphatic group or an aromatic group), such as butyl lithium or phenyl lithium, or by electrochemical insertion of lithium.

(4) Sulfur (Simple Substance)

Sulfur used in the present invention is simple substance. The purity of sulfur is preferably not lower than 99.9%.

The present invention uses sulfur powder, which preferably has a particle diameter of not greater than 10 μm. The lower limit of the particle diameter is 0.1 μm.

(5) Lithium Sulfide

The lithium sulfide used in the present invention is generally represented by Formula (1) given below:

$$(Li_xS)_n \qquad (1)$$

where $0<x\leq2$ and $n>0$. Concrete examples include $Li_2S$, $Li_2S_2$, $Li_2S_4$, $Li_{26}S$, $Li_2S_6$, $Li_2S_8$, and $Li_2S_{12}$.

These lithium sulfides are obtained by reduction of lithium sulfate, oxidation of lithium hydrogensulfide, or chemical treatment of sulfur. Especially preferable are $Li_2S$ and $Li_2S_2$, which are stable in the solid state. Polysulfide solutions including ions may also be applicable.

Lithium-containing sulfur, which is present in a state of unfixed ratio, for example, chain sulfur containing lithium, may be used in place of the stoichiometrically stable lithium sulfide listed above. In this case, n is not less than 2 in Formula (1) and there is no upper limit for n. The lithium sulfide obtained by lithiating a sulfur having the cyclic structure has n in an approximate range of 8 to 20, whereas the lithium sulfide obtained by lithiating a sulfur having the chain structure has infinite n. In the present invention, any appropriate value may be selected for n in the lithium sulfide, unless the lithium sulfide is escaped or dispersed during the production of a positive electrode mixture to interfere with production of the positive electrode.

Any of the lithium sulfides may be used alone or as a mixture thereof. Lithium sulfide may be used as one of the starting materials or alternatively be obtained by lithiation of the mixture of sulfur and the metal complex.

Mixing the SS with lithium sulfide in a molecular level in the solution forms an inorganic-organic hybrid structure. The battery including the positive electrode having the inorganic-organic hybrid structure effectively prevents the active materials from being escaped or isolated in the course of charging and discharging operations and attains the preferable charge-discharge cycle characteristics.

The content of sulfur and/or lithium sulfide is 0.1 to 10 parts by weight or preferably 0.5 to 5 parts by weight per 1 part by weight of the SS and/or the metal complex.

(6) Conductive Polymer

It is effective to add an electrically conductive polymer to the positive electrode of the present invention. Preferable examples of the conductive polymer include polyaniline, polypyrrole, polyacene, polythiophene, and polyacetylene. Mixing the conductive polymer with the SS and lithium sulfide in molecular level results in three-dimensional blending of these constituents. This forms a high-order inorganic-polymer hybrid structure, in which the respective constituents are tangled each other. The inorganic-polymer hybrid structure causes especially the thiolato compound and lithium sulfide to be firmly held in the positive electrode. This improves the charge-discharge cycles of the thiolato compound and lithium sulfide.

Especially polyaniline has excellent conductivity. Either the thiol compound or the thiolato compound acts as a dopant of polyaniline and forms a composite substance. The thiol compound and/or the thiolato compound, the polyaniline molecule, and lithium sulfide thus interact in a three-dimensional manner.

The polyaniline used here is obtained by polymerizing aniline or its derivative through chemical polymerization or electrolytic polymerization. The reductive polyaniline in the de-doped state effectively traps organic disulfide monomers. The reduction index (RDI) of polyaniline is represented by electron absorption spectra of an n-methyl-2-pyrrolidone solution containing a trace quantity of polyaniline. More concretely, RDI is represented as a ratio $I_{640}/I_{340}$ of an intensity ($I_{640}$) of an absorption peak that is caused by the quinonediimine structure and appears in a long wavelength range of about 640 nm to an intensity ($I_{340}$) of an absorption peak that is caused by the para-substituted benzene structure and appears in a short wavelength range of about 340 nm. The polyaniline having the RDI of not greater than 0.5 is preferably used.

It is preferable that the polyaniline used here has a conductivity of not greater than $10^{-10}$ S/cm.

It is preferable that 0.01 to 10 parts by weight of the SS and polyaniline are added to 1 part by weight of the metal complex. It is further preferable that 0.01 to 10 parts by weight of polyaniline are mixed with 1 part by weight of the SS.

(7) Electrolyte

An electrolyte containing a metal cation $M^+$ may be added to the positive electrode of the present invention. A solid or semi-solid polymer electrolyte is preferable since it is difficult to diffuse and move the SS compound and the metal complex therein.

The polymer electrolyte is obtained, for example, by dissolving a lithium salt, such as $LiClO_4$, $LiCF_3SO_3$, and/or $LiN(CF_3SO_2)_2$, in polyethylene oxide. The semi-solid polymer electrolyte is obtained by dissolving one or plural lithium salts, such as $LiClO_4$, $LiCF_3SO_3$, $LiBF_4$, $LiPF_6$, and $LiN(CF_3SO_2)_2$, in a non-aqueous solvent like propylene carbonate and/or ethylene carbonate to provide an electrolytic solution and gelling the electrolytic solution with a polymer, such as polyacrylonitrile, polyvinylidene fluoride, polyacrylic acid, or polyethylene oxide.

(8) Organic Binder

With the view to enhancing the film-forming property or molding property and the strength of the film, an organic polymer binder, such as polyvinyl pyrrolidone, polyvinyl alcohol, polyvinyl pyridine, or polyvinylidene fluoride, may be added to the positive electrode of the present invention.

For the purpose of further enhancement of the electric conductivity, a conductive agent may be added. Typical examples of the conductive agent are carbon powder and fibers, such as graphite powder, acetylene black powder, and graphite fibers.

Additives conventionally used may further be added to the positive electrode, as long as they do not damage the effects of the present invention.

2. Method of Producing Positive Electrode

In order to produce the positive electrode of the present invention, a thiolato compound and/or a thiol compound, a solvent for dissolving these compounds, and sulfur and/or lithium sulfide are mixed homogeneously. It is preferable that the solvent also dissolves lithium sulfide therein. Preferable examples of the solvent include tetrahydrofuran, N,N-dimethylformamide, and N-R-2-pyrrolidone, where R represents a hydrogen atom or an alkyl group, such as $CH_3$, $C_2H_5$, or $C_3H_7$.

The method of producing the positive electrode according to the present invention includes the steps of: (a) dissolving at least one organic sulfide compound selected from the group consisting of a thiolato compound and a thiol compound, in a solvent to provide a solution; (b) mixing at least one selected from the group consisting of sulfur and a lithium sulfide represented by Formula (1) given below with the solution thus obtained to provide a mixture:

$$(Li_xS)_n \qquad (1)$$

where $0<x\leq2$ and $n>0$; and (c) heating and drying the mixture thus obtained, so as to produce the positive electrode.

It is preferable that the step (c) applies the mixture on a conductive substrate and heats the applied mixture on the conductive substrate in an atmosphere of inert gas or in vacuo, so as to obtain the positive electrode. In this case, the conductive substrate itself may be heated.

In accordance with one preferable application of the present invention, the method further includes the step of adding a conductive polymer to the solution obtained in the step (a), prior to the step (b).

In accordance with another preferable application of the present invention, the method further includes the step of lithiating the thiol compound and/or sulfur included in the positive electrode, after the step (c).

A preferable example of the solvent is N-R-2-pyrrolidone, where R represents either a hydrogen atom or an alkyl group.

In accordance with one preferable embodiment the present invention, the method of producing the positive electrode includes the steps of: (a) dissolving at least one compound, which is selected from the group consisting of a thiolato compound and a thiol compound, in N-R-2-pyrrolidone to provide a solution; (b) mixing sulfur with the solution thus obtained to provide a mixture; (c) applying the mixture thus obtained on a conductive substrate and heating the conductive substrate in an atmosphere of inert gas or in vacuo, so as to prepare an electrode; and (d) lithiating sulfur included in the electrode. In the step (d), the thiol compound may be lithiated.

In accordance with another preferable embodiment of the present invention, the method of producing the positive electrode includes the steps of: (a) dissolving a thiol compound in N-R-2-pyrrolidone to provide a solution; (b) mixing lithium sulfide with the solution thus obtained to provide a mixture; (c) applying the mixture thus obtained on a conductive substrate and heating the conductive substrate in an atmosphere of inert gas or in vacuo, so as to prepare an electrode; and (d) lithiating the thiol compound included in the electrode.

The use of N-R-2-pyrrolidone as the solvent enables the thiol compound, the thiolato compound, sulfur, lithium sulfide, and polyaniline to be homogeneously dispersed in the molecular level. This easily gives a thin-film electrode of homogeneous composition or an electrode of large area. N-R-2-pyrrolidone is commercially available and used as delivered. It is, however, preferable that the water content of commercially available N-R-2-pyrrolidone is reduced to or below 20 ppm with a zeolite adsorbent.

Known conditions may be adopted in the method of manufacturing the positive electrode. Concrete processes will be discussed in examples given below.

3. Lithium Battery

The lithium battery of the present invention is manufactured from the positive electrode discussed above, a negative electrode, and a non-aqueous electrolyte according to a known method. The non-aqueous electrolyte may be a polymer electrode. The gel electrolyte mentioned above may be used as the polymer electrolyte. The lithium battery of the present invention may be a primary battery or a secondary battery.

The present invention is described more in detail with some examples, although the present invention is not restricted to these examples.

EXAMPLE 1

2,5-Dimercapto-1,3,4-thiadiazole (hereinafter referred to as "DMcT") was lithiated to provide a lithium thiolato compound (hereinafter referred to as "L-DMcT"). The lithiation was implemented by soaking DMcT in a n-hexane solution of n-butyl lithium (1.53 mol/l) for one hour. The lithium thiolato compound was washed well with n-hexane. Then, 1.3 g of L-DMcT thus obtained, 0.2 g of DMcT, and 2g of lithium sulfide ($Li_2S$) were dissolved in 5 g of tetrahydrofuran.

Also, 2.3 g of $LiBF_4$ was dissolved in a mixed solvent containing 10.5 g of propylene carbonate and 7.9 g of ethylene carbonate to provide an organic electrolytic solution.

Subsequently, 3 g of polyacrylonitrile powder was added to the organic electrolytic solution, the solution was heated to 100° C. to dissolve the polyacrylonitrile powder in the organic electrolytic solution to a gel, and then the gel was diluted with 20 g of acetonitrile to prepare a gel electrolytic solution.

Then, mixed 1 g of the gel electrolytic solution, 2 g of the tetrahydrofuran solution prepared as above, and 0.05 g of acetylene black powder were mixed to provide a slurry mixture. A porous carbon sheet composed of a fluororesin and acetylene black and having a thickness of 50 μm was cut into a size of 5×10 cm. The slurry mixture was applied on the porous carbon sheet and heated and dried at 60° C. in vacuo to give a positive electrode A. The positive electrode A had a total thickness of 75 μm including the thickness of the porous carbon sheet.

COMPARATIVE EXAMPLE 1

In first, 1 g of the gel electrolytic solution prepared in Example 1, 1 g of DMCT powder prepared in Example 1, and 0.05 g of acetylene black powder were mixed to provide a slurry mixture. Then, the slurry mixture was applied on the porous carbon sheet and dried in the same manner as that of Example 1, so as to give a positive electrode A'. The positive electrode A' had a total thickness of 80 μm including the thickness of the porous carbon sheet.

EXAMPLE 2

In first, 1 g of lithium sulfide ($Li_2S$) and sulfur 0.7 g and further 1.5 g of L-DMCT were dissolved in 5 g of N,N-dimethylformamide. Then, 2 g of the N,N-dimethylformamide solution thus obtained and 0.05 g of acetylene black powder were mixed with 1 g of the gel electrolytic solution prepared in Example 1 to provide a slurry mixture. The slurry mixture was applied on the porous carbon sheet and dried in the same manner as that of Example 1, so as to give a positive electrode B. The positive electrode B had a total thickness of 85 μm including the thickness of the porous carbon sheet.

COMPARATIVE EXAMPLE 2

In first, 1 g of sulfur powder were dissolved in 5 g of tetrahydrofuran, and the obtained sulfur solution and 0.05 g of acetylene black powder were mixed with 1 g of the gel electrolytic solution prepared in Example 1 to provide a slurry mixture. The slurry mixture was applied on the porous carbon sheet and dried in the same manner as that of Example 1, so as to give a positive electrode B'. The positive electrode B' had a total thickness of 77 μm including the thickness of the porous carbon sheet.

EXAMPLE 3

In first, 1.5 g of the L-DMcT obtained in Example 1 was dissolved in 10 g of N-methyl-2-pyrrolidone (hereinafter referred to as "NMP"). Polyaniline (Anilide manufactured by NITTO DENKO CORPORATION: hereinafter referred to as "Pan") was de-doped in an alkaline solution and reduced with hydrazine to give PAn of the de-doped and reduced state. The PAn of the de-doped and reduced state had a conductivity of $10^{-8}$ S/cm and an RDI value of 0.28. Then, 1.0 g of the PAn powder of the de-doped and reduced state was added to the NMP solution, so as to obtain a bluish green, viscous (L-DMcT)-PAn-NMP solution. Subsequently, mixed 2 g of lithium sulfide ($Li_2S$) was mixed with the viscous solution, so as to prepare a viscous ink. A titanium foil collector having a thickness of 30 μm was cut into a size of 5×8 cm. The viscous ink was applied on the titanium foil collector and dried at 80° C. in vacuo for two hours, so as to give a positive electrode C. The positive electrode C had a total thickness of 53 μm including the thickness of the titanium foil.

COMPARATIVE EXAMPLE 3

A DMcT-PAn-NMP solution prepared in the same manner as that of Example 3 was applied on a titanium foil collector and dried to give a positive electrode C'. The positive electrode C' had a total thickness of 51 μm including the thickness of the titanium foil.

EXAMPLE 4

In first, 2 g of sulfur simple substance was mixed with a bluish green, viscous DMcT-PAn-NMP solution prepared in the same manner as that of Example 3 to prepare a viscous ink. The viscous ink was applied on the titanium foil collector and dried at 80° C. in vacuo for two hours in the same manner as that of Example 3, so as to give an electrode.

The dried electrode was dipped in a n-hexane solution of n-butyl lithium (1.53 mol/l) for 30 minutes to be lithiated. Then, the electrode was washed well with n-hexane. A resulting positive electrode D had a thickness of 61 μm including the thickness of the titanium foil.

COMPARATIVE EXAMPLE 4

A DMcT-PAn-NMP solution prepared in the same manner as that of Example 3 was applied on a titanium foil collector and dried to give an electrode. The dried electrode was treated with the n-hexane solution of n-butyl lithium in the same manner as that of Example 4. A resulting positive electrode D' had a thickness of 59 μm including the thickness of the titanium foil.

The positive electrodes A through D of Examples 1 through 4 and the positive electrodes A' through D' of Comparative Examples 1 through 4 were respectively assembled with a negative electrode of metal lithium having a thickness of 0.3 mm and separator layers. This gave square secondary batteries A through D and A' through D' having a size of 2×2 cm. A gel electrolyte having a thickness of 0.6 mm was used for each separator layer. The gel electrolyte was obtained by gelling 20.7 g of a mixed solution, which was prepared by dissolving 1 M $LiBF_4$ in a solvent mixture of propylene carbonate and ethylene carbonate at a volume ratio of 1 to 1, with 3.0 g of polyacrylonitrile. These batteries were repeatedly charged and discharged in a range of 4.65 to 2.0 V at a constant current of 0.2 mA at 20° C. The service capacity was measured at the respective charge-discharge cycles. The charge-discharge cycle characteristics were evaluated, based on a decrease in service capacity with the progress of the charge-discharge cycles. The results of the evaluation are shown in Table 1.

TABLE 1

| Charge-Discharge | | Service Capacity (mAh) | | | |
|---|---|---|---|---|---|
| Cycle (time) | | 1 | 5 | 50 | 100 |
| Batteries | A | 5.4 | 5.4 | 5.3 | 5.3 |
| | A' | 1.4 | 1.2 | 0.4 | 0.2 |
| | B | 5.5 | 5.5 | 5.3 | 5.2 |
| | B' | 5.4 | 4.3 | 3.5 | 1.0 |
| | C | 5.7 | 5.6 | 5.6 | 5.6 |
| | C' | 1.5 | 1.4 | 1.2 | 1.0 |
| | D | 5.5 | 5.4 | 5.3 | 5.3 |
| | D' | 1.4 | 1.2 | 1.0 | 0.8 |

As clearly shown in Table 1, the lithium secondary batteries of the examples according to the present invention have greater service capacities and less decreases in service capacity with the progress of the charge-discharge cycles, compared with the lithium secondary batteries of the comparative examples.

Figure 1:
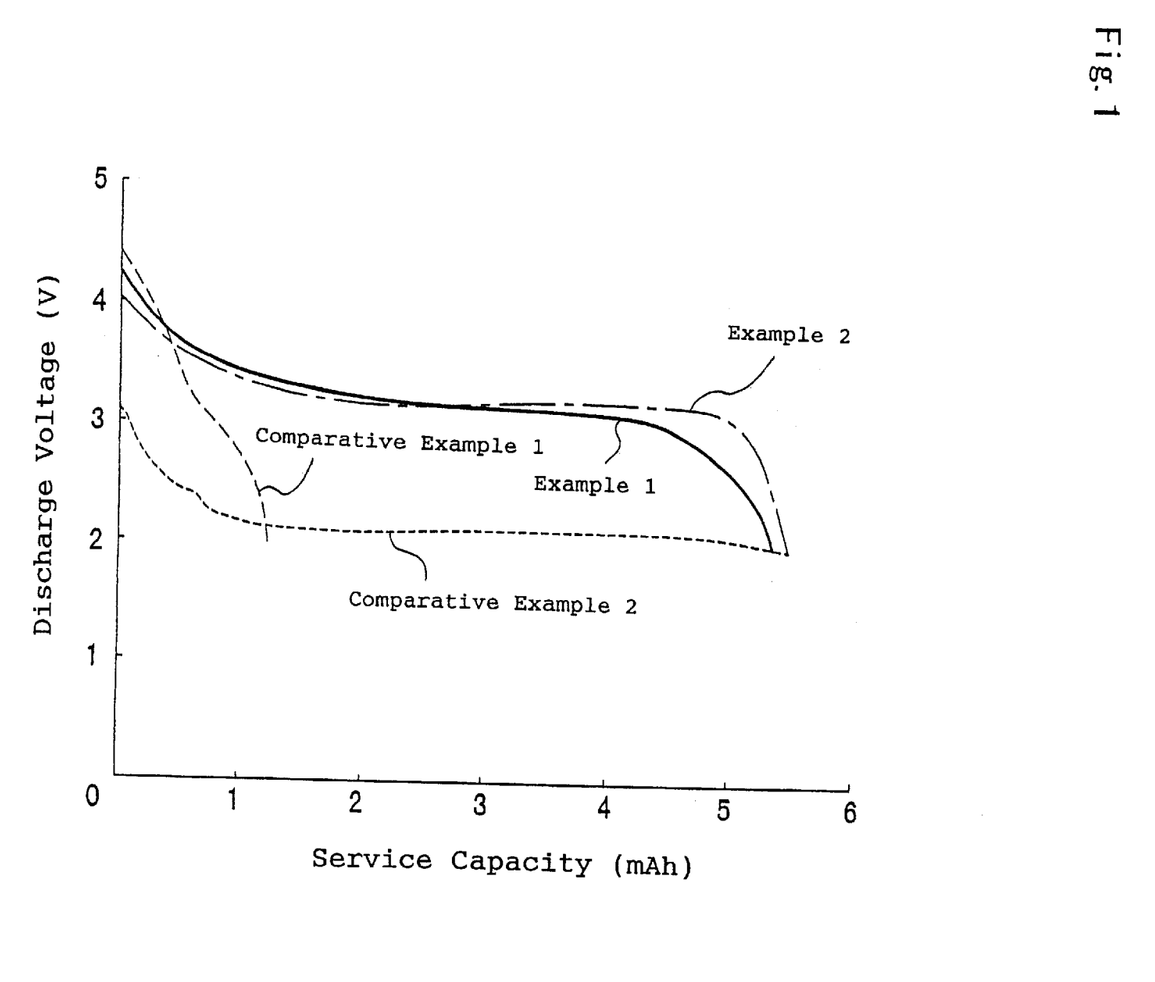
FIG. 1 is a graph showing discharge characteristics of lithium batteries including positive electrodes of Examples 1 and 2 of the present invention and Comparative Examples 1 and 2 at a fifth charge and discharge cycle.

FIG. 1 is a graph showing discharge voltages against the service capacity at a 5th charge-discharge cycle with regard to the batteries A, B, A', and B' respectively including the positive electrodes of Examples 1 and 2 and Comparative Examples 1 and 2. The service capacity (unit: mAh) is plotted as abscissa, and the cell voltage (unit: V) as ordinate. As clearly understood from FIG. 1, in the case of the batteries A and B including the positive electrodes of the present invention, the discharge voltage is substantially kept plateau in a range of 3.5 to 2.5 V against the increasing service capacity. In the case of the battery A' of Comparative Example, on the other hand, the discharge voltage drastically falls with an increase in service capacity. In the case of the battery B', the discharge voltage is substantially kept plateau at a level of about 2 V over a wide range of the service capacity.

Figure 2:
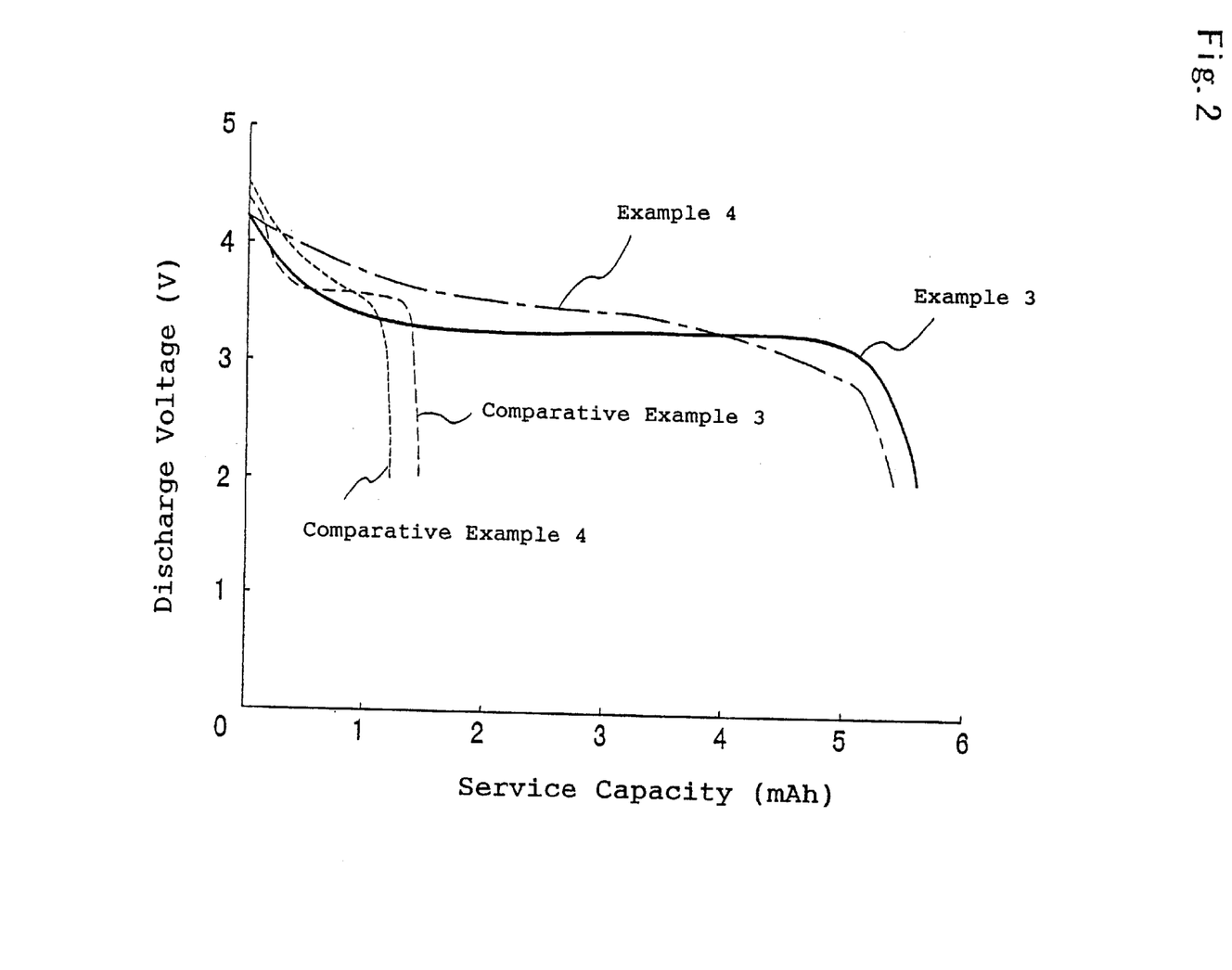
FIG. 2 is a graph showing discharge characteristics of lithium batteries including positive electrodes of Examples 3 and 4 of the present invention and Comparative Examples 3 and 4 at a fifth charge and discharge cycle.

FIG. 2 is a graph showing discharge voltages against the service capacity at a 5th charge-discharge cycle with regard to the batteries C, D, C', and D' respectively including the positive electrodes of Examples 3 and 4 and Comparative Examples 3 and 4. As shown in the graph of FIG. 2, in the case of the lithium secondary batteries of the present invention, the discharge voltage is substantially kept plateau in a range of 3.5 to 2.5 V against the increasing service capacity.

As clearly understood from Table 1 and FIGS. 1 and 2, the lithium secondary batteries of the present invention maintain the high service capacity while keeping the voltage at a level of about 3 V. The service capacity is not significantly lowered under the condition of repeated charge-discharge cycles. Namely these lithium secondary batteries have favorable charge-discharge cycles.

In the above examples, metal lithium is applied for the negative electrode. Since the lithium secondary batteries of the present invention include lithium as the component of the positive electrode active material, however, a lithium-free negative electrode, such as a carbon negative electrode, may be used instead of the lithium negative electrode.

In the above examples, DMcT is used as the starting material of the lithium thiolato compound. Any of other organic disulfide compounds, organic trisulfide compounds, organic tetrasulfide compounds, other thiol compounds, and mixtures thereof may also be used as the starting material to exert the same effects.

In the above examples, polyaniline is used as the conductive polymer. Any of other polypyrroles, polyacenes, polythiophenes, polyacetylenes, and mixtures thereof may also be used as the conductive material.

Addition of an electron-conductive substance or an organic polymer binder to the positive electrode active material does not damage the effects of the present invention.

In the above examples, butyl lithium is used to lithiate the thiol compound or the simple substance of sulfur. Similar effects are exerted in the case of using phenyl lithium in place of butyl lithium or in the case of applying another method for the lithiation.

As described above, the technique of the present invention effectively prevents the positive electrode active material from being escaped or isolated from the positive electrode in the course of charging or discharging and thereby gives a lithium secondary battery of high energy density that maintains the voltage characteristics of the lithium thiolato compound and the high capacity characteristics of lithium sulfide and has a relatively plateau discharge voltage of 3V level.

EXAMPLE 5

In first, 0.76 g (6 millimoles) of iodine was dissolved in 50 ml of ethanol to prepare a solution 'a', and 1.02 g (6 millimoles) of copper (II) chloride dihydrate ($CuCL_2.2H_2O$) was dissolved in 25 mil of ethanol to prepare a solution 'b'. The solutions 'a' and 'b' were mixed with each other, so as to give a solution mixture 'c'. Then, 1.8 g (12 millimoles) of 2,5-dimercapto-1,3,4-thiadiazole (DMcT) was dissolved in 50 ml of ethanol to prepare a solution 'd' and the solution 'd' was mixed with the solution mixture 'c' to obtain a reddish orange complex to deposit as a solid substance. The liquid containing the solid substance was centrifuged. The solid substance was removed from the liquid and washed with hot alcohol several times. Finally, the solid substance was washed with ethyl ether and dried in vacuo, so as to obtain a complex of copper coordinating with two molecules of DMcT $Cu(C_2HN_2S_3)_2$ (hereinafter referred to as "DMcT-Cu").

Then, 1 g of the DMcT-Cu powder, 1 g of sulfur (simple substance), 0.25 g of acetylene black powder, and 0.15 g of acrylonitrile/methyl acrylate copolymer powder (molar ratio of copolymerization=95:5, number-average molecular weight: 400,000) were grounded and blended to obtain a mixture. An electrolytic solution was prepared by dissolving 1M $LiBF_4$ and 0.5 M $LiPF_6$ in a solvent mixture of ethylene carbonate and dimethyl carbonate (volumetric ratio of 1 to 1).

Next, 3.0 g of the electrolytic solution was added to the mixture and kneaded the whole mixture well. The kneaded mixture was heated to 75° C. and rolled with a heat press roller. The rolled mixture was contact-bonded to a titanium foil collector of 30 μm in thickness. The resulting composite electrode had a thickness of 55 μm including the thickness of the titanium foil.

EXAMPLE 6

In first, 0.76 g (6 millimoles) of iodine was dissolved in 50 ml of ethanol to prepare a solution 'a', and 0.51 g (3 millimoles) of silver nitrate and 0.51 g (3 millimoles) of copper (II) chloride dihydrate ($CuCL_2.2H_2O$) were dissolved in 25 mil of ethanol to prepare a solution 'b'. The solutions 'a' and 'b' were mixed with each other, so as to give a solution mixture 'c'. Further, 2.1 g (12 millimoles) of S-triazine-2,4,6-trithiol (hereinafter referred to as "TTA") was dissolved in 50 ml of ethanol to prepare a solution 'd'. The solution 'd' was mixed with the solution mixture 'c' and subjected to the same treatment as that performed in the case of DMcT. This gave a complex of silver and copper in which TTA is coordinated on silver ion and copper ion, $Cu_3Ag_3(C_3N_3S_3)_4$ (hereinafter referred to as "TTA-CuAg").

An organic electrolytic solution was prepared by dissolving 2.3 g of $LiBF_4$ in a solvent mixture containing 10.5 g of propylene carbonate and 7.9 g of ethylene carbonate. Further, 3.0 g of polyacrylonitrile powder was added to the organic electrolytic solution and the polyacrylonitrile was dissolved in the solution at 100° C. for gelation. Then, the gel was diluted with 20 g of acetonitrile, so as to obtain a gel electrolytic solution.

Then, 1 g of lithium sulfide $Li_2S$ and 0.7 g of sulfur were dissolved in 5 g of tetrahydrofuran to prepare a polysulfide solution.

1 g of the gel electrolytic solution, 1 g of the polysulfide solution, 1 g of the TTA-CuAg powder, and 0.05 g of acetylene black powder were mixed to yield a slurry mixture. A porous carbon sheet of 50 μm in thickness composed of a fluororesin and acetylene black was cut into a size of 5×10 cm. The slurry mixture thus prepared was applied on the cut piece of the porous carbon sheet and heated at 70° C. in vacuo. The resulting composite electrode had a thickness of 58 μm including the thickness of the porous carbon sheet.

EXAMPLE 7

In first, 0.36 g (2 millimoles) of palladium(II) chloride $PdCl_2$ was dissolved in 30 ml of water containing 0.15 g of potassium chloride KCl to prepare a solution 'a'. Also, 0.6 g (4 millimoles) of DMcT was dissolved in 50 ml of ethanol to prepare a solution 'b'. The solutions 'a' and 'b' were mixed with each other, so as to make a dark brown complex deposit as a solid substance. The liquid containing the solid substance was centrifuged, and the solid substance was removed from the liquid and washed with hot alcohol several times. Finally, the solid substance was washed with ethyl ether and dried in vacuo, so as to obtain a complex of palladium coordinating with two molecules of DMcT, $Pd(C_2HN_2S_3)_2$ (hereinafter referred to as "DMcT-Pd").

Then, 0.5 g of the DMcT-Pd powder, 0.5 g of the DMcT-Cu powder prepared in Example 5, 1 g of sulfur (simple substance), 0.25 g of acetylene black powder, and 0.15 g of acrylonitrile/methyl acrylate copolymer powder (molar ratio of copolymerization=95:5, number-average molecular weight: 400,000) were grounded and blended and, 3.0 g of an electrolytic solution, which was prepared by dissolving 1M $LiBF_4$ and 0.5 M $LiPF_6$ in a solvent mixture of ethylene carbonate and dimethyl carbonate (volumetric ratio of 1 to 1), was added to the grounded mixture and kneaded the whole mixture well. The kneaded mixture was heated to 75° C. and rolled with a heat press roller. The rolled mixture was pressed and adhered onto a titanium foil collector of 30 μm in thickness. The resulting composite electrode had a thickness of 53 μm including the thickness of the titanium foil.

EXAMPLE 8

DMcT-Cu powder was soaked in a n-hexane solution of n-butyl lithium (1.53 mol/l) for 30 minutes for lithiation. The soaked powder was washed well with n-hexane. This gave $Cu(C_2LiN_2S_3)_2$ (hereinafter referred to as "L-DMcT-Cu") with the —S—Li group substituting the S-H group. Then, 1 g of the L-DMcT-Cu powder, 1 g of the gel electrolytic solution and 1 g of the polysulfide solution both prepared in Example 6, and 0.05 g of acetylene black powder were mixed together to yield a slurry mixture. The slurry mixture thus prepared was applied on a cut piece of the porous carbon sheet and heated at 70° C. in vacuo. The resulting composite electrode had a thickness of 54 μm including the thickness of the porous carbon sheet.

COMPARATIVE EXAMPLE 5

The composite electrode having a thickness of 55 μm was obtained in the same manner as Example 5, except that sulfur (simple substance) powder was not included.

COMPARATIVE EXAMPLE 6

The composite electrode having a thickness of 52 μm was obtained in the same manner as Example 5, except that sulfur (simple substance) powder was not included and that 1 g of DMCT was used in place of DMcT-Cu.

COMPARATIVE EXAMPLE 7

The composite electrode having a thickness of 54 μm was obtained in the same manner as Example 5, except that DMcT-Cu was not included.

COMPARATIVE EXAMPLE 8

The composite electrode having a thickness of 55 μm was obtained in the same manner as Example 6, except that the polysulfide solution was not included.

Figure 3:
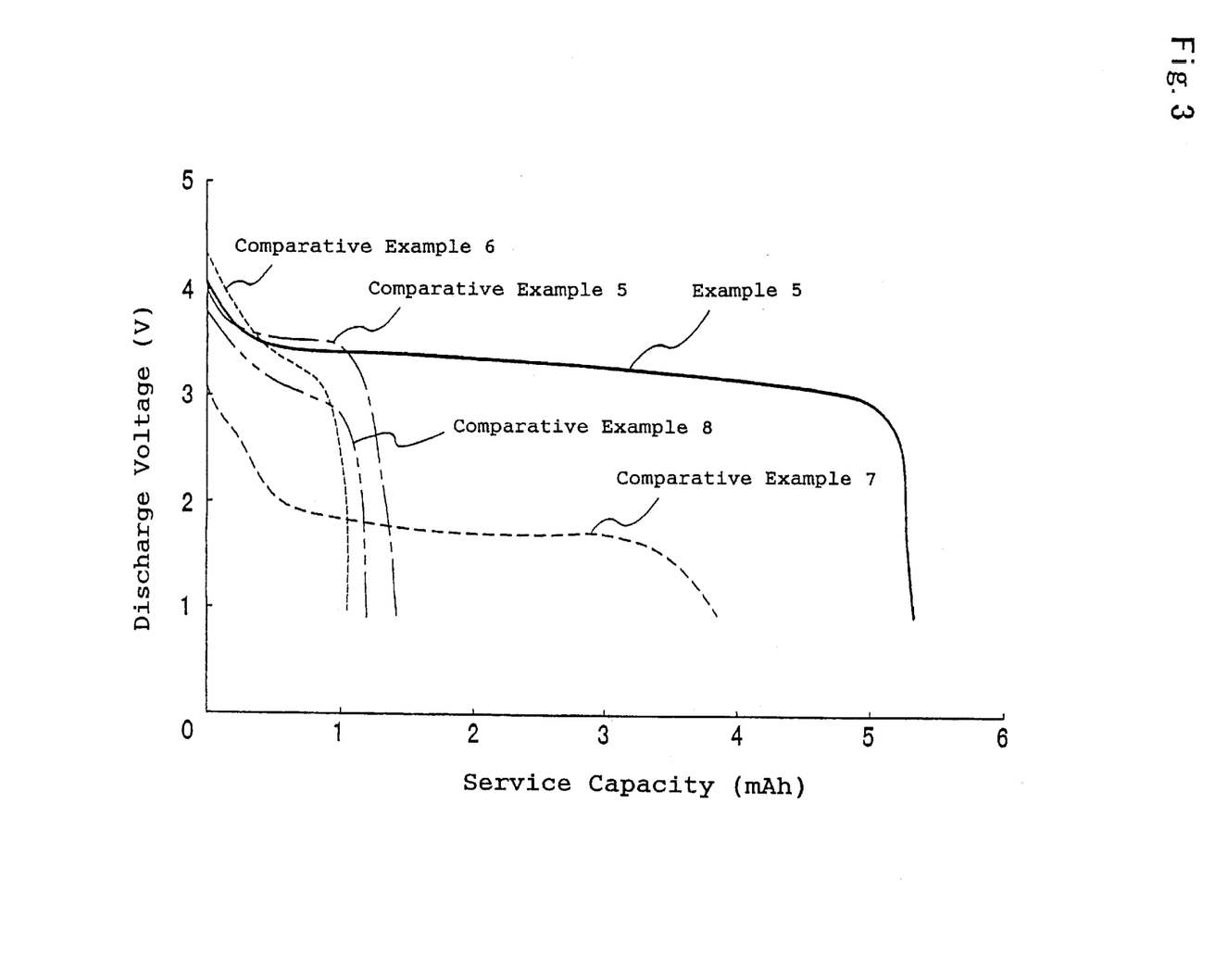
FIG. 3 is a graph showing discharge curves of lithium secondary batteries including positive electrodes-of Example 5 of the present invention and Comparative Examples 5 through 8.

The respective electrodes thus obtained were evaluated for their performances. The composite electrodes obtained in Examples 5 through 8 and Comparative Examples 5 through 8 were used as positive electrodes and respectively assembled with a negative electrode of metal lithium having a thickness of 0.3 mm and separator layers. This gave square secondary batteries having a size of 2×2 cm. A gel electrolyte having a thickness of 0.3 mm was used for each separator layer. The gel electrolyte was obtained by gelling 20.7 g of a mixed solution, which was prepared by dissolving 1 M $LiBF_4$ in a solvent mixture of propylene carbonate and ethylene carbonate at a volume ratio of 1 to 1, with 3.0 g of polyacrylonitrile. These batteries were repeatedly charged and discharged in a range of 4.35 to 1.0 V at a fixed current of 1 mA at 20° C. The service capacity (unit: mAh) was measured at the respective charge-discharge cycles. The charge-discharge cycle characteristics were evaluated, based on a decrease in service capacity with the progress of the charge-discharge cycles. The results of the evaluation are shown in Table 2. FIG. 3 is a graph showing discharge curves of the lithium secondary batteries including the positive electrodes of Example 5 and Comparative Examples 5 through 8 at a 5th charge-discharge cycle.

The service capacity (unit: mAh) is plotted as abscissa and the discharge voltage as ordinate (unit: V).

TABLE 2

| Charge-Discharge | Service Capacity (mAh) | | | |
|---|---|---|---|---|
| Cycle (time) | 1 | 5 | 50 | 100 |
| Example 5 | 5.4 | 5.3 | 5.1 | 5.1 |
| Example 6 | 5.2 | 5.1 | 5.1 | 4.9 |
| Example 7 | 5.3 | 5.2 | 5.1 | 5.0 |
| Example 8 | 4.9 | 4.9 | 4.8 | 4.8 |
| Comparative Example 5 | 1.5 | 1.4 | 1.2 | 1.2 |
| Comparative Example 6 | 1.3 | 1.0 | 0.9 | 0.8 |
| Comparative Example 7 | 4.1 | 3.9 | 3.6 | 3.0 |
| Comparative Example 8 | 1.3 | 1.2 | 1.1 | 1.0 |

As clearly understood from the results of Table 2, the batteries including the electrodes of the examples according to the present invention have less decreases in service capacity with the progress of the charge-discharge cycles, compared with the batteries including the electrodes of the comparative examples. As shown in FIG. 3, the battery using the electrode of the present invention has the discharge voltage kept substantially plateau at a high level against the large service capacity. The batteries of the comparative examples, on the other hand, show an abrupt decrease in discharge voltage against the small service capacity or have a low discharge voltage over a wide range of the service capacity.

EXAMPLE 9

Polyaniline (Anilide manufactured by NITTO DENKO CORPORATION: hereinafter referred to as "Pan") was de-doped in an alkaline solution and reduced with hydrazine to give PAn of the de-doped and reduced state. The PAn of the de-doped and reduced state had a conductivity of $10^{-8}$ S/cm and an RDI value of 0.26. Then, 1.5 g of DMcT was dissolved in 10 g of NMP to prepare a solution 'a', and 1.0 g of the PAn powder of the de-doped and reduced state was added to the solution 'a', so as to obtain a bluish green, viscous DMCT-PAn-NMP solution.

Subsequently, 0.35 g of divalent anhydrous copper chloride ($CuCl_2$), 1.0 g of sulfur (simple substance), and 5 g of NMP were added to the DMcT-PAn-NMP solution obtained previously, so as to prepare a viscous ink.

A titanium foil collector having a thickness of 30 $\mu$m was cut into a size of 5×8 cm. The viscous ink was applied on the titanium foil collector and dried at 80° C. in vacuo for two hours, so as to give a composite electrode. The composite electrode had a total thickness of 51 $\mu$m including the thickness of the titanium foil.

EXAMPLE 10

After dissolving 1.8 g of TTA in 10 g of NMP, 1.0 g of the PAn powder of the de-doped and reduced state prepared in Example 9 was added thereto, so as to obtain a bluish green, viscous TTA-PAn-NMP solution 'a'. Then, a solution 'b' was prepared by dissolving 0.18 g of divalent anhydrous copper chloride ($CuCl_2$) and 0.6 g of silver trifluoromethanesulfonate ($CF_3SO_3Ag$) in 5 g of NMP. Also, a polysulfide solution 'c' was prepared by dissolving 1 g of lithium sulfide $Li_2S$ and 0.7 g of sulfur in 5 g of tetrahydrofuran.

All the solutions 'a', 'b', and 'c' were mixed to obtain viscous ink. The ink was applied on the titanium foil and dried in the same manner as Example 9. The composite electrode thus obtained had a total thickness of 49 $\mu$m including the thickness of the titanium foil.

EXAMPLE 11

After dissolving 1.8 g of DMcT in 10 g of NMP, 1.0 g of the PAn powder of the de-doped and reduced state prepared in Example 9 was added thereto, so as to obtain a bluish green, viscous DMcT-PAn-NMP solution 'a'. Then, a solution 'b' was prepared by dissolving 0.18 g of palladium(II) chloride $PdCl_2$ in 5 g of NMP. Also, a solution 'c' was prepared by dissolving 0.18 g of divalent anhydrous copper chloride $CuCl_2$ in 5 g of NMP. The solution 'b' was added to the solution 'a' and vigorously stirred. The solution 'c' was then added to the solution mixture and vigorously stirred. Viscous ink was obtained by further adding 1.0 g of sulfur to the solution mixture.

The ink was applied on the titanium foil and dried in the same manner as Example 9. The composite electrode thus obtained had a total thickness of 52 $\mu$m including the thickness of the titanium foil.

EXAMPLE 12

For the purpose of lithiation, DMcT powder was soaked in a n-hexane solution of n-butyl lithium.(1.53 mol/l) for 30 minutes. The powder was washed well with n-hexane. This gave $C_2Li_2N_2S_3$ (hereinafter referred to as "L-DMcT") with the —S—Li group substituting the —S—H group. After dissolving 1.8 g of L-DMcT in 10 g of NMP, 1.0 g of the PAn powder of the de-doped and reduced state prepared in Example 9 was added thereto, so as to obtain a bluish green, viscous L-DMcT-PAn-NMP solution 'a'.

Then, a solution 'b' was prepared by dissolving 0.35 g of divalent anhydrous copper chloride ($CuCl_2$) in 5 g of NMP. Also, a polysulfide solution 'c' was prepared by dissolving 1 g of lithium sulfide $Li_2S$ and 0.7 g of sulfur in 5 g of tetrahydrofuran.

All the solutions 'a', 'b', and 'c' were mixed to obtain viscous ink. The ink was applied on the titanium foil and dried in the same manner as Example 9. The composite electrode thus obtained had a total thickness of 50 $\mu$m including the thickness of the titanium foil.

COMPARATIVE EXAMPLE 9

A composite electrode having a total thickness of 49 $\mu$m was prepared in the same manner as Example 9, except that sulfur powder (simple body) was not included.

COMPARATIVE EXAMPLE 10

A composite electrode having a total thickness of 50 $\mu$m was prepared in the same manner as Example 10, except that the polysulfide solution was not included.

COMPARATIVE EXAMPLE 11

A composite electrode having a total thickness of 51 μm was prepared in the same manner as Example 11, except that sulfur powder (simple body) was not included.

COMPARATIVE EXAMPLE 12

A composite electrode having a total thickness of 52 μm was prepared in the same manner as Example 12, except that the polysulfide solution was not included.

Figure 4:
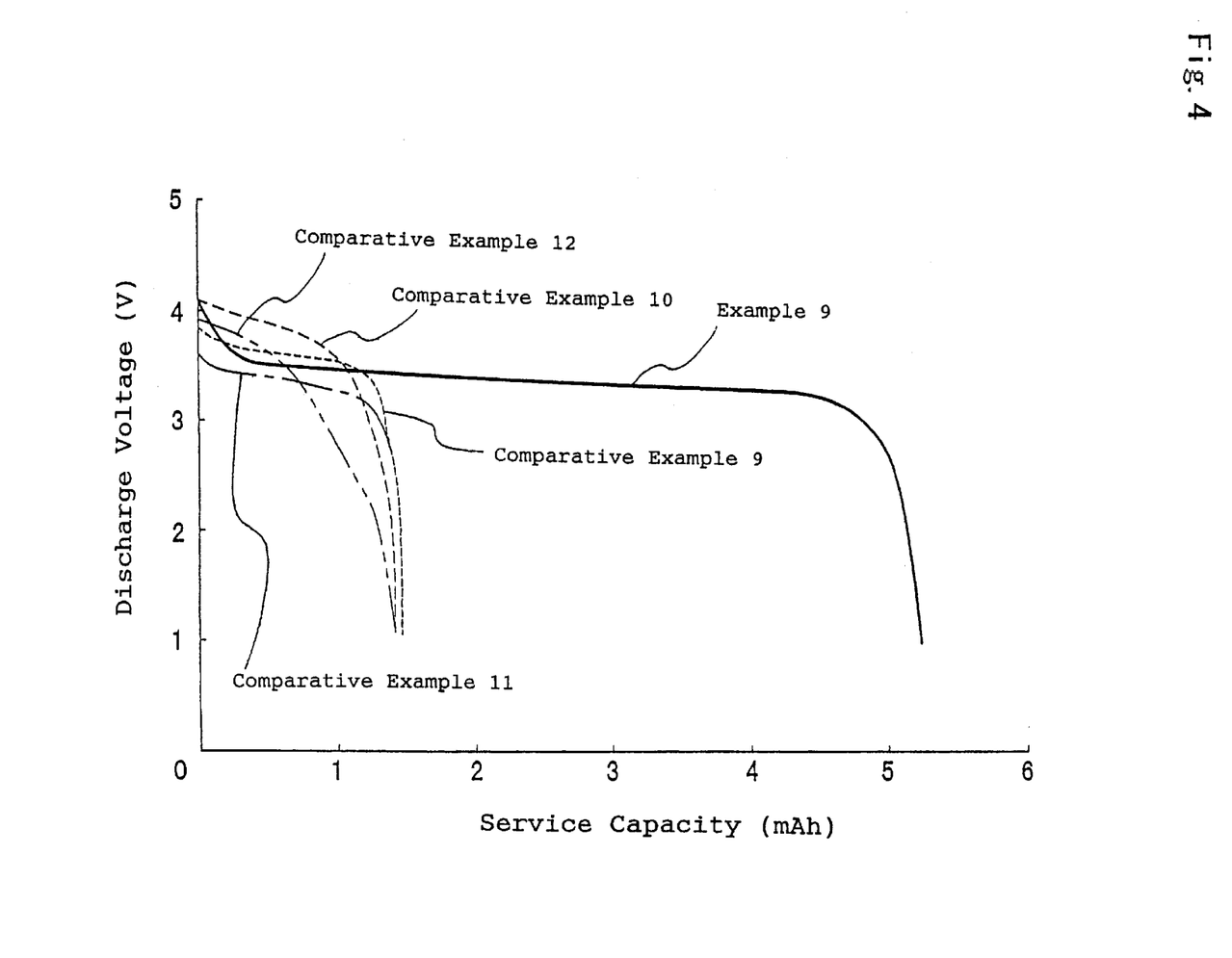
FIG. 4 is a graph showing discharge curves of lithium secondary batteries including positive electrodes of Example 9 of the present invention and Comparative Examples 9 through 12.

The respective electrodes were evaluated for their performances. Square batteries having a size of 2×2 cm were manufactured by using the composite electrodes of Examples 9 through 12 and Comparative Examples 9 through 12 as the positive electrode and metal lithium having a thickness of 0.3 mm as the negative electrode. A gel electrolyte having a thickness of 0.2 mm was used for each separator layer. The gel electrolyte was obtained by gelling 20.7 g of a mixed solution, which was prepared by dissolving 1 M $LiBF_4$ and 0.3 M $LiPF_6$ in a solvent mixture of ethylene carbonate and dimethyl carbonate at a volume ratio of 1 to 1, with 3.0 g of polyacrylonitrile. These batteries were repeatedly charged and discharged in a range of 4.35 to 1.0 V at a fixed current of 1 mA at 20° C. The service capacity (unit: mAh) was measured at the respective charge-discharge cycles. The charge-discharge cycle characteristics were evaluated, based on a decrease in service capacity with the progress of the charge-discharge cycles. The results of the evaluation are shown in Table 3. FIG. 4 is a graph showing discharge curves of the lithium secondary batteries including the positive electrodes of Example 9 and Comparative Examples 9 through 12 at a $5^{th}$ charge-discharge cycle. The service capacity (unit: mAh) is plotted as abscissa and the discharge voltage as ordinate (unit: V).

As clearly understood from the results of Table 3, the batteries including the electrodes of the examples according to the present invention have less decreases in service capacity with the progress of the charge-discharge cycles, compared with the batteries including the electrodes of the comparative examples. As shown in FIG. 4, the battery using the electrode of the present invention has the discharge voltage kept substantially plateau at a high level against the large service capacity. The batteries of the comparative examples, on the other hand, show an abrupt decrease in discharge voltage against the small service capacity.

As clearly understood from Tables 2 and 3 and FIGS. 3 and 4, the lithium secondary batteries of the present invention hold a high capacitance while keeping a voltage of about 3V. The capacitance of these batteries is not lowered under the conditions of repeated charge and discharge. These examples give lithium batteries having favorable charge-discharge cycles.

In the above examples, DMcT and TTA are used as the starting materials of the metal complex and the lithium-containing metal complex. Any of other organic sulfide compounds may also be used as the starting material to exert the same effects. The above examples use butyl lithium for lithiation. Other chemicals and other techniques may be applied to exert the same effects.

In the above examples, NMP is commercially available and used as delivered or after treatment with a zeolite adsorbent to have the water content of not greater than 20 ppm. Pyrrolidone, N-ethyl-2-pyrrolidone, and N-butyl-2-pyrrolidone may be used as well.

In the above examples, titanium foil and carbon sheet are used as the collector of the electrode. Other available examples include metal foils, such as aluminum, copper, and stainless steel, conductive polymer films, such as polyaniline and polypyrrole, and metal foils and carbon sheets coated or covered with the conductive polymer film.

The composite electrode of the present invention actualizes the battery having a greater capacitance and a higher voltage than those of the conventional secondary batteries. The composite electrode of the present invention gives a secondary battery of high energy density, which suppresses escape of the positive electrode active material from the positive electrode and has a less decrease in service capacity during charge and discharge operations.

The above examples regard the application to the batteries. Application of the composite electrode of the present invention to the counter electrode may also attain electrochromic elements having high speeds of color development and color degradation, biochemical sensors having a high speed of response, such as glucose sensor, and electrochemical analog memories having high writing and reading speeds.

What is claimed is:

1. A positive electrode comprising:
   (a) a metal complex having an inorganic-organic hybrid structure with at least one organic sulfide compound having at least one group in the compound selected from the group consisting of thiolato groups and thiol groups, wherein the metal of the metal complex is at least one having a varying ionic valence,
   (b) a lithium sulfide represented by Formula (1):

$$(Li_xS)_n, \qquad (1)$$

where $0<x\leq 2$ and $n>0$, wherein the lithium sulfide is bonded to the metal complex, and
   (c) a conductive polymer.

2. The positive electrode in accordance with claim 1, wherein said thiolato group is at least one selected from the group consisting of a lithium disulfide group, a lithium trisulfide group, and a lithium tetrasulfide group.

3. The positive electrode in accordance with claim 1, wherein said thiol group is at least one selected from the group consisting of a disulfide group, a trisulfide group, and a tetrasulfide group.

4. The positive electrode in accordance with claim 1, wherein the metal of the metal complex is selected from the group consisting of Cu, Ag, Au, Ni, Pd, Pt, Co, Rh, Ir, Cr, Mn, and Fe.

5. The positive electrode in accordance with claim 1, wherein the metal of the metal complex is selected from the group consisting of Cu and Ag.

6. A lithium battery comprising said positive electrode in accordance with claim 1, a negative electrode and a non-aqueous electrolyte.

* * * * *